United States Patent [19]

Buehler et al.

[11] Patent Number: 5,705,576
[45] Date of Patent: Jan. 6, 1998

[54] PROCESS FOR CONTROLLING PRODUCTION OF IN-SITU THERMOPLASTIC POLYOLEFINS AND PRODUCTS

[75] Inventors: Charles K. Buehler, Lansing, Mich.; Thaddeus W. Klimek, Orland Park, Ill.

[73] Assignee: Quantum Chemical Corporation, Cincinnati, Ohio

[21] Appl. No.: 439,924

[22] Filed: May 12, 1995

Related U.S. Application Data

[63] Continuation-in-part of Ser. No. 975,488, Nov. 12, 1992, abandoned.

[51] Int. Cl.$^6$ ............................................. C08F 2/34
[52] U.S. Cl. .......................... 526/60; 526/65; 526/901; 526/351
[58] Field of Search ....................... 526/65, 59, 60, 526/351, 901

[56] References Cited

U.S. PATENT DOCUMENTS

| | | | |
|---|---|---|---|
| 3,220,998 | 11/1965 | Berger | 526/61 |
| 4,003,712 | 1/1977 | Miller | 526/68 |
| 4,048,412 | 9/1977 | Caumartin et al. | 525/53 |
| 4,260,710 | 4/1981 | Staiger et al. | 502/105 |
| 4,309,521 | 1/1982 | Sato et al. | 502/108 |
| 4,338,424 | 7/1982 | Morita et al. | 526/65 |
| 4,360,650 | 11/1982 | Desvignes et al. | 526/60 |
| 4,420,592 | 12/1983 | Kato et al. | 526/65 |
| 4,454,299 | 6/1984 | Schweier et al. | 525/53 |
| 4,455,405 | 6/1984 | Jaggard et al. | 525/247 |
| 4,547,552 | 10/1985 | Toyota et al. | 525/247 |
| 4,582,878 | 4/1986 | Chiba et al. | 525/268 |
| 4,703,094 | 10/1987 | Raufast | 422/131 |
| 4,739,015 | 4/1988 | Toyota et al. | 525/270 |
| 4,740,550 | 4/1988 | Foster | 525/52 |
| 4,740,551 | 4/1988 | Foster | 525/53 |
| 4,814,377 | 3/1989 | Joyce | 525/211 |
| 4,820,775 | 4/1989 | Shiga et al. | 525/247 |
| 4,863,769 | 9/1989 | Lustig et al. | 428/34.9 |
| 4,882,380 | 11/1989 | Ficker et al. | 525/53 |
| 4,902,483 | 2/1990 | Raufast | 422/134 |
| 4,950,631 | 8/1990 | Buehler et al. | 502/119 |
| 4,977,210 | 12/1990 | Kerth et al. | 525/323 |
| 4,978,722 | 12/1990 | Goko et al. | 525/53 |
| 5,006,600 | 4/1991 | Buechner et al. | 525/53 |
| 5,034,365 | 7/1991 | Buehler et al. | 526/119 |
| 5,037,789 | 8/1991 | Buehler | 526/119 |
| 5,047,468 | 9/1991 | Lee et al. | 525/53 |
| 5,051,388 | 9/1991 | Buehler et al. | 502/113 |
| 5,104,949 | 4/1992 | Buehler et al. | 526/116 |
| 5,126,398 | 6/1992 | Lee et al. | 525/240 |
| 5,143,883 | 9/1992 | Buehler et al. | 526/119 |
| 5,149,738 | 9/1992 | Lee et al. | 525/53 |
| 5,221,650 | 6/1993 | Buehler | 502/104 |
| 5,275,991 | 1/1994 | Buehler et al. | 502/107 |

FOREIGN PATENT DOCUMENTS

| | | |
|---|---|---|
| 0 050 013 A2 | 4/1982 | European Pat. Off. . |
| 0 074 194 A3 | 3/1983 | European Pat. Off. . |
| 2 109 800 B | 6/1983 | European Pat. Off. . |
| 0 174 863 A2 | 3/1986 | European Pat. Off. . |
| 0 225 099 A2 | 6/1987 | European Pat. Off. . |
| 0 276 734 A2 | 8/1988 | European Pat. Off. . |
| 4000224 A1 | 1/1990 | European Pat. Off. . |
| 442316 A2 | 8/1991 | European Pat. Off. . |

OTHER PUBLICATIONS

Ross, J.F. et al., "An Improed Gas–Phase Polypropylene Process," *Ind. Eng. Chem. Prod. Res. Dev.*, 1985, 24, pp. 149–154.

Randall, J.C., "A Review of High Resolution Liquid $^{13}$Carbon Nuclear Magnetic Resonance Characterizations of Ethylene–Based Polymers," *JMS–Rev. Macromol. Chem. Phys.*, C29 (2 & 3), 201–317 (1989). Marcel Dekker, Inc.

GM Test Procedure 9911P: "Scuff Resistance Test for Painted TPO Plastics," (Draft, Jan. 1994) pp. 1–2.

Ford Laboratory Test Method BI 107-5: "Thermal Shock Test for Paint Adhesion," Product & Manufacturing Engineering Staff, Apr. 10, 1990, pp. 1–7.

*Primary Examiner*—Thomas R. Weber
*Attorney, Agent, or Firm*—Gerald A. Baracka; William A. Heidrich

[57] ABSTRACT

An improved gas-phase polymerization process for producing in-situ thermoplastic polyolefins in multiple reactors using high activity Ti/Al catalysts is provided. The improvement consists of developing a control parameter derived from eight integrated regions of the copolymer $^{13}$C NMR spectrum, defining the limits of the control parameter for the process, and operating the process to maintain the parameter within the defined limits. This is accomplished by adjusting the amount of ethylene fed to the secondary reactor and adjusting other process variables as required. Thermoplastic polyolefins, i.e., modified polypropylenes, having reduced hexane extractables and improved paint adhesion are also disclosed.

20 Claims, No Drawings

PROCESS FOR CONTROLLING PRODUCTION OF IN-SITU THERMOPLASTIC POLYOLEFINS AND PRODUCTS

CROSS-REFERENCE TO RELATED APPLICATION

This is a continuation-in-part of application Ser. No. 07/975,488, filed Nov. 12, 1992, now abandoned.

BACKGROUND OF THE INVENTION

1. Field of the Invention

The present invention relates to an improved gas-phase copolymerization process for producing in-situ thermoplastic polyolefins using high activity Ti/Al catalyst systems whereby polymerization conditions are controlled through the use of a control parameter. By monitoring the copolymer produced, ethylene feed and other process conditions are controlled and maintained within a specified range to produce polymers having improved properties.

2. Description of the Prior Art

A class of polypropylene which has enjoyed significant growth is propylene impact copolymer. These are two-phase materials consisting of a continuous phase of highly isotactic polypropylene and a dispersed phase of rubber-like ethylene-propylene copolymer. While these products can be produced by melt compounding, existing multi-reactor technology makes it possible to directly produce these products. This is conveniently accomplished by polymerizing propylene in a first reactor and discharging the polypropylene homopolymer from the first reactor into a secondary reactor where propylene and ethylene are copolymerized in the presence of the polypropylene. Gas-phase polymerizations of this type are described in the article by Ross, et al., "An Improved Gas-Phase Polypropylene Process," Ind. Eng. Chem. Prod. Res. Dev. 1985, 24, 149–154. This gas-phase technology has been extended to products containing significantly higher rubber/elastomer contents which are referred to as in-situ thermoplastic polyolefins (TPO). Copolymers of propylene and ethylene obtained utilizing Ziegler-Natta catalysts have been described in the prior art. U.S. Pat. No. 4,260,710 describes a process for producing propylene homopolymers and copolymers of propylene with other α-olefins utilizing Ziegler-Natta catalysts in a stirred vessel using catalyst components which can include a titanium halide and an aluminum alkyl.

U.S. Pat. Nos. 4,454,299 and 4,455,405 describe processes for the preparation of block copolymers of propylene and ethylene in two reaction zones using Ziegler-Natta catalysts. In these processes, propylene is first polymerized in gas form in an initial reaction zone and the resulting homopolymer is then transferred to a second reactor where a mixture of ethylene and propylene are polymerized therewith.

In U.S. Pat. No. 4,547,552 a process is disclosed to produce chemically blended propylene polymer compositions having ethylene contents from 3 to 40 weight percent. The process comprises polymerizing propylene in a first stage with 0 to 5 mol percent of another olefin and, in a second stage, polymerizing propylene and ethylene or propylene, ethylene and another olefin in the presence of the reaction product from the first step. Rubbery propylene copolymer and crystalline ethylene polymer or copolymer are produced in this manner.

U.S. Pat. No. 4,882,380 describes a gas-phase polymerization to produce products having an ethylene-propylene copolymer incorporated in a propylene homopolymer or copolymer matrix. This is accomplished by contacting propylene or another α-olefin in a first reactor using the prescribed catalyst and then passing the mixture to a second reactor where ethylene and propylene are polymerized to provide an ethylene-propylene copolymer.

Other references dealing with multi-stage polymerizations of olefins include U.S. Pat. Nos. 4,338,424; 4,420,592; 4,582,878; 4,703,094; 4,739,015; 4,740,550; 4,740,551; 4,814,377; 4,820,775; 4,902,483 and 4,977,210. Whereas all of the aforementioned processes provide useful polymers, difficulties are encountered as ethylene contents are increased. The major problem is the stickiness of the product due to the increased rubber content and the increased content of "fines." In extreme cases, the product may even be heterogeneous and two distinct types of particles can be detected. Analysis of these particles has shown one to contain little or no ethylene incorporation and the other to contain virtually all of the ethylene incorporation. It would be highly advantageous if a process were available whereby polymerization conditions could be controlled to eliminate the aforementioned problems associated with heretofore known procedures. These and other advantages are realized with the present improved process.

SUMMARY OF THE INVENTION

The present process utilizes two reactors for the polymerization of propylene and ethylene to produce in-situ TPOs. In one highly useful embodiment of the invention, the polymerizations are carried out in the gas phase using fixed bed stirred reactors. In a first reactor propylene is homopolymerized at 50° C. to 100° C. and 250 psig to 650 psig using a titanium catalyst and an organoaluminum cocatalyst. The homopolymer product produced in the first reactor is then fed to a second reactor where propylene and ethylene are copolymerized at 25° C. to 80° C. and 100 psig to 500 psig.

The improvement of the present invention which permits the preparation of in-situ TPOs having ethylene contents greater than 15 weight percent and improved physical properties is the ability to independently control and balance conditions in the first and second reactors. This is accomplished by calculating a control parameter, $Q_c$, using the integrated peak areas of specified regions of the $^{13}C$ NMR spectrum for these polymers and controlling the amount of ethylene to the secondary reactor and other process variables to maintain the value of the parameter within a defined range. This is conveniently achieved by monitoring the product produced, i.e., the modified polypropylene obtained from the second reactor, and comparing the actual value obtained for the product, $Q_A$, with the control parameter or, more specifically, the limits defined therefor.

In a preferred embodiment of the invention, the control parameter $Q_c$ is derived from eight integral regions of the $^{13}C$ NMR spectrum as follows:

$$Q_c = \frac{A}{B}$$

where $A=1.167R_1+0.75R_2+1.5R_3+1.5R_4+1.167R_8$ $B=0.667R_1+0.5R_2+R_5+R_6+R_7+0.667R_8$ and $R_1$ through $R_8$ have the following peak assignments

| | |
|---|---|
| $R_1$ | 37.9 PPM |
| $R_2$ | 37.5 PPM |
| $R_3$ | 33.2 PPM |
| $R_4$ | 31.2–30.9 PPM |
| $R_5$ | 30.4 PPM |
| $R_6$ | 30.0 PPM |
| $R_7$ | 27.4 PPM |
| $R_8$ | 24.9 PPM | and the process conditions are maintained so that, $Q_A$, the value of the product being produced, is from 0.65 to 1.0 and, more preferably, from 0.75 to 0.98.

Improved in-situ TPO products containing from 15 to 30 weight percent ethylene and having values for Q, where Q is obtained in accordance with the above equation, from 0.65 to 1.0 are also included in the invention. The products of the invention have significantly reduced hexane extractables and markedly improved paint adhesion.

DETAILED DESCRIPTION OF THE INVENTION

The present invention relates to an improved process for the polymerization of propylene and ethylene to produce in-situ TPOs, also referred to herein as modified polypropylenes, with increased ethylene contents. The process utilizes dual reactors connected in series for the polymerization. Whereas it is most advantageous to conduct both polymerizations in the gas phase, either the first or second reactor may be operated in a mode other than gas phase.

In a first reactor, propylene is homopolymerized at a temperature from 50° C. to 100° C. and pressure from 250 psig to 650 psig utilizing a titanium catalyst and an organoaluminum cocatalyst. More preferably, the temperature in the first reactor will be from 50° C. to 90° C. and the pressure will range from 300 psig to 450 psig.

The highly isotactic homopolymer produced in the first reactor is directly fed to a second reactor which is maintained at 25° C. to 80° C. and 100 psig to 500 psig where propylene and ethylene are copolymerized in the presence of the homopolymer. The amount of ethylene employed in the second reactor is sufficient to produce a copolymer of propylene and ethylene with rubber-like characteristics. Ethylene levels sufficient to achieve 15–30 weight percent and, more preferably, 15–25 weight percent ethylene incorporation are employed. Polymerization in the second reactor is generally accomplished without additional catalyst; however, it may be advantageous, to introduce more catalyst to the second reactor. If more catalyst is employed, it can be the same as the catalyst used in the first polymerization or different. Preferably, the second polymerization reactor is operated at 40° C. to 70° C. and 100 psig to 350 psig.

The use of dual or cascading reactors for the copolymerization of propylene and ethylene to produce impact copolymers is known. Similarly, gas-phase polymerizations utilizing stirred, fixed beds comprised of small polymer particles are also known. For additional information regarding gas-phase polymerizations and a schematic flow diagram of the process, reference may be made to the article by Ross, et al., in *Ind. Eng. Chem. Prod. Res. Dev.*, 1985, 24: 149–154.

A high activity titanium catalyst activated by contact with an organoaluminum cocatalyst is utilized to produce polymer particles for these polymerizations. The polymerizations are carried out in the substantial absence of liquid reaction medium and gas velocity within the stirred-bed is maintained below the onset of fluidization. Depending on their compositional makeup, gases can be recirculated through external heat exchangers for cooling or partially condensed. Cooled monomer is recirculated into the reactor and provides thermal control. Recirculated monomer vaporizes when it is introduced into the reactor so that polymerization occurs in the gas phase. In the preferred mode of operation, i.e., stirred, fixed-bed gas phase, the first and second reactors are fitted with spiral agitators to maintain a turbulent mechanically fluidized bed of polymer powder and prevent agglomeration.

Each reactor typically has its own control system(s) and is capable of independent operation. In the usual conduct of the process, propylene and ethylene monomers are passed through desiccant beds prior to introduction. Means are usually provided to individually meter the propylene, ethylene, hydrogen for molecular weight control, catalyst and cocatalyst. This makes it possible to more readily control and maintain the desired reactor conditions. If desired, monomer may be injected into the recirculated gas stream for introduction into the system. Suitable controls are also provided to vary the pressure, temperature and compositional analysis to facilitate maintaining a constant environment in the reactor and/or to permit adjustment of conditions to bring the system into conformance. Residence times in both reactors are on the order of 1 to 4 hours.

Highly isotactic polypropylene produced in the first reactor is introduced into a second reactor. This is facilitated by operating the primary reactor at a somewhat higher pressure than that maintained in the secondary reactor. Propylene, ethylene and hydrogen, as required, are metered into the second reactor so that ethylene and propylene are copolymerized in intimate admixture with the propylene homopolymer. In usual practice, there is sufficient catalyst present with the polypropylene to bring about polymerization in the second reactor and no further catalyst addition is required. Under certain circumstances, however, it may be advantageous to add additional catalyst/cocatalyst which can be the same or different as that used in the first reactor.

The final modified polypropylene product, which is an intimate mixture of the highly isotactic homopolymer produced in the first reactor and rubber-like copolymer produced in the second reactor, is discharged into a pressure letdown vessel where low pressure recycle gas consisting largely of unreacted monomers is volatilized for recycling. The polymer can be processed to incorporate one or more additives and, if desired, pelletized. It is typically not necessary that the polymer exiting the second reactor be processed in a catalyst deactivation unit; however, for applications where extremely low levels of catalysts are required, this may be done.

Ethylene contents of the polymers will be greater than 15 weight percent and can range up to 30 weight percent or above. More typically the amount of ethylene in the TPO will be from 15 to 25 weight percent. If desired, other α-olefins containing from 4 to 8 carbon atoms can be included in the polymerization and incorporated. Butene-1, pentene-1 and octene-1 are useful comonomers for this purpose.

Hydrogen is generally included in both reactors for control of molecular weight. The amount of hydrogen can range from 0.1 up to about 10 mole percent. More typically, hydrogen levels range from 0.1 to 5 mole percent in the primary reactor and from 1 to 10 mole percent in the secondary reactor.

Small amounts of known modifiers or inhibitors may also be included in these polymerizations. These can include compounds such as oxygen, carbon monoxide, carbon dioxide, sulfur dioxide, glycol ethers, aliphatic and aromatic alcohols, carboxylic acids, sulfonic acids, water, and primary or secondary amines. The use of compounds of this type are disclosed in U.S. Pat. No. 4,739,015 and European Patent Application 86308952.0, published Jun. 10, 1987, Publication No. 0225099 and reference may be had thereto for additional detail.

To effect polymerization of propylene and ethylene, a high activity Ziegler-Natta catalyst comprised of a titanium-containing catalyst component and organoaluminum cocatalyst component is necessarily employed. Such catalysts are known and are referred to herein as Ti/Al catalysts. These may include additional components, such as a support, modifying compound(s), magnesium and other metal compound(s), electron donating compound(s), and the like.

Ti/Al catalyst systems utilized for the present process may be unsupported or they may be associated with conventional support materials. When supported, the support may be treated prior to incorporation of the titanium component. Conventional inorganic materials, such as silica, alumina, magnesium chloride, magnesium oxide, magnesium hydroxide and the like, can be used as supports.

Titanium compounds used generally correspond to the formula $Ti(OR)_n X_m$ where R is aryl and/or alkyl, X is halogen, n is 1 to 4, m is 0 to 3 with the proviso that m+n=4. Illustrative titanium compounds include: tetracresyl titanate, titanium tetrabutoxide, titanium tetranonolate, tetra 2-ethylhexyltitanate, tetra isobutyltitanate, tetra n-propyltitanate, tetra isopropyltitanate, titanium tetrachloride, titanium tetrabromide, methoxytitanium trichloride, ethoxytitanium trichloride, diethoxytitanium dichloride and the like. Trivalent compounds of titanium, such as titanium tribromide and titanium trichloride, may also be utilized.

Examples of useful magnesium compounds which can be used in the preparation of the catalysts include: magnesium oxide, magnesium hydroxide, hydrotalcite, carboxylic acid salts of magnesium, alkoxy magnesiums, aryloxy magnesiums, alkoxy magnesium halides, aryloxy magnesium halides, magnesium dihalides, organomagnesium compounds and the like. Magnesium chloride ($MgCl_2$) is widely used for the preparation of useful catalysts for polymerizing propylene and ethylene.

Representative electron donors include: ethers, alcohols, esters, aldehydes, aliphatic (fatty) acids, aromatic acids, ketones, nitriles, amines, amides, urea, thiourea, isocyanates, azo compounds, phosphines, phosphites, thioethers, thioalcohols, etc. Specifically, there can be mentioned diethyl ether, di-n-butyl ether, diphenyl ether, ethylene glycol monomethyl ether, diethylene glycol dimethyl ether, methanol, ethanol, propanol, ethyl acetate, vinyl acetate, acetaldehyde, benzaldehyde, acetic acid, propionic acid, succinic acid, acrylic acid, benzoic acid, methyl ethyl ketone, benzophenone, acetonitrile, diethylamine, tributylamine, triethylphosphine, triphenylphosphine oxide, and triethylphosphite.

The organoaluminum cocatalyst is usually an alkylaluminum or alkylaluminum halide and can include: trimethylaluminum, triethylaluminum, tri-n-propylaluminum, tri-n-butylaluminum, tri-i-butylaluminum, tri-n-hexylaluminum, tri-2-methylpentylaluminum, tri-n-octylaluminum, diethylaluminum monochloride, di-n-propylaluminum monochloride, di-i-butylaluminum monochloride, diethylaluminum monobromide, diethylaluminum monoiodide, diethylaluminum hydride, methylaluminum sesquichloride, ethylaluminum sesquichloride, ethylaluminum dichloride, and i-butylaluminum dichloride. Mixtures of these organoaluminum compounds can also be advantageously employed.

In addition to the foregoing, other compounds may be used in the preparation of catalysts useful for gas-phase polymerization of propylene and ethylene. These compounds serve different functions and, in some cases, they may be multi-functional. They may act as activators or modifiers for the titanium compound or support or may themselves have catalytic or cocatalytic activity. Examples of such compounds include: silicon halides, such as silicon tetrachloride; boron halides, such as boron trichloride; silanes, such as hexyltrimethoxysilane, amyltriethoxysilane, isobutyltrimethoxysilane, trichlorosilane, dichlorosilane and dibromosilane; hexaalkyldisilazanes, such as hexamethyldisilazane; and vanadium compounds, such as vanadium oxychloride and vanadium tetrachloride.

Ti/Al catalysts used for the gas-phase process of the invention are high activity catalysts, that is, they are capable of producing more than 5000 grams copolymer per gram of catalyst. In a more preferred embodiment, Ti/Al catalysts capable of producing 7000 grams or more copolymer per gram of catalyst are used. The amount of titanium catalyst used with supported catalysts is generally such that residual Ti contents in the copolymer are less than 10 ppm and, more preferably, below 5 ppm. With unsupported Ti/Al catalysts, the amount of catalyst used is such that residual Ti is less than 55 ppm and, more preferably, less than 40 ppm. Useful Ti/Al catalysts which can be employed for the process are described in U.S. Pat. Nos. 4,260,710; 4,309,521; 4,454,299; 4,547,552; 4,739,015; 4,814,377; 4,820,775 and 5,037,789.

In a particularly useful embodiment, highly active supported Ti/Al catalysts wherein the support is treated to remove or react surface hydroxyl groups prior to contacting with the titanium-containing compound are employed. Such pre-treatment or reaction of the support with a variety of materials makes it possible to produce catalysts which possess high activity for the polymerization of olefins in gas-phase processes. Such catalysts and their use for the homopolymerization of propylene are described in U.S. Pat. Nos. 4,950,631; 5,034,365; 5,051,388; 5,143,883; 5,221,650; and 5,275,991.

One preferred supported catalysts of the above type useful for the preparation of the propylene-ethylene copolymers in accordance with the invention, referred to as embodiment I, is obtained by: (a) treating silica to remove surface hydroxyl groups by calcining said silica in an inert atmosphere and treating with a hexaalkyldisilazane; (b) contacting said treated silica with (1) a modifying compound selected from the group consisting of silicon halides, boron halides, aluminum halides, alkyl silicon halides and mixtures thereof; and (2) at least one hydrocarbon soluble magnesium-containing compound selected from the group consisting of hydrocarbyloxy magnesiums, hydrocarbyloxymagnesium halides and mixtures thereof; said contacting steps (1) and (2) occurring in random order; (c) contacting said product of step (b) with at least one titanium-containing compound having the structural formula $Ti(OR)_n X_m$, where R is aryl, alkyl or mixtures thereof; X is halogen; n is an integer of 1 to 4; m is 0 or an integer of 1 to 3; and the sum of m and n is 4; and (d) treating the product of step (c) with a titanium-containing compound having the structural formula $TiX^1_p (OR^1)_q$, where $X^1$ is halogen; $R^1$ is aryl or alkyl; p is an integer 1 to 4; q is 0 or an integer of 1 to 3; and the sum of p and q is 4, with the proviso that the titanium-containing compound of this step is not the same as the titanium-containing compound of step(c). Supported catalysts of this type are described in U.S. Pat. No. 4,950,631 which is incorporated herein by reference.

In another preferred embodiment (embodiment II), the catalyst is obtained by treating silica to remove surface hydroxyl groups by calcining in an inert atmosphere and treating with a hexaalkyldisilazane and reacting said modified silica support having a selective distribution of reactive hydroxyl groups with a magnesium compound reactive with said surface hydroxyl groups, optionally reacting the thus obtained product with a silicon halide, alkyl silicon halide, boron halide or aluminum halide, further reacting the so-produced first material with a tetra-substituted organo halogen-free titanium compound wherein the organic moiety sterically hinders accessibility of said organo titanium compound to the reactive sites on the modified silica support and thereafter reacting the so-produced second material with a titanium halide. Supported catalysts of this type and procedures for their preparation are described in U.S. Pat. Nos. 5,143,883; 5,221,650; and 5,275,991 which are incorporated herein by reference.

For yet another preferred embodiment (embodiment III), the catalyst is prepared by (a) contacting silica, in random order, with (1) at least one hydrocarbon soluble magnesium-containing compound; and (2) a first modifying compound selected from the group consisting of silicon halide; boron halides, aluminum halides and mixtures thereof followed by a second modifying compound selected from the group consisting of a silane of the formula $SiH_rX^2_s$, where $X^2$ is halogen; r is an integer of 1 to 3; and s is an integer of 1 to 3, with the proviso that the sum of r and s is 4, hydrogen halides having the structural formula $HX^3$, where $X^3$ is halogen, and mixtures thereof, said sequence of contact of silica with said components (1) and (2) being random; (b) contacting the product of step (a) with a first titanium-containing compound having the structural formula $Ti(OR)_mX_n$, where R is hydrocarbyl or cresyl; X is halogen; m is an integer of 1 to 4; and n is 0 or an integer of 1 to 3, with the proviso that the sum of m and n is 4; and (c) contacting the product of step (b) with a second titanium-containing compound having the structural formula $TiX^1_p(OR^1)_q$, where $X^1$ is halogen; $R^1$ is hydrocarbyl; p is an integer of 1 to 4; q is 0 or an integer of 1 to 3, with the provisos that the sum of p and q is 4 and that said first titanium-containing compound and said second titanium-containing compound are different. Catalysts of this type are described in U.S. Pat. No. 5,034,365 which is incorporated herein by reference.

For another preferred embodiment (embodiment IV), a highly useful catalyst is produced by (a) treating an inert inorganic support with hexamethyldisilazane to remove surface hydroxyl groups and heating at 100°–150° C. for ½ to 3 hours; (b) contacting said treated inert inorganic support with a hydrocarbon soluble magnesium compound; (c) contacting said product of said step (b) with a modifying compound selected from the group consisting of silicon halides, boron halides, aluminum halides, hexaalkyldisilazanes and mixtures thereof; (d) contacting said product of said step (c) with a vanadium compound having the structural formula $V(O)_sX^1_{4-s}$, where $X^1$ is halogen; and s is 0 or 1; a first titanium-containing compound having the structural formula $TiX^3_p(OR^3)_q$, where $X^3$ is halogen; $R^3$ is hydrocarbyl; p is an integer of 1 to 4; and q is 0 or an integer of 1 to 3, with the proviso that the sum of p and q is 4 and, optionally, a second titanium-containing compound of the formula $Ti(OR^2)_nX^2_m$, where $R^2$ is hydrocarbyl; $X^2$ is halogen; n is an integer of 1 to 4, and m is 0 or an integer of 1 to 3 with the proviso that the sum of n and m is 4; and with the further proviso that if two titanium-containing compounds are used said first and said second titanium-containing compounds are not identical.

A final preferred embodiment (embodiment V) utilizes a catalyst component obtained by (a) treating an inert inorganic support to a temperature of 100° C. to 150° C. for ½ to 3 hours to remove surface hydroxyl groups; (b) contacting the treated inert inorganic compound with a hydrocarbon soluble magnesium compound; (c) contacting the product of said step (b) with a modifying compound selected from the group consisting of silicon halides, boron halides, aluminum halides, alkyl silicon halides, hexaalkyldisilazanes and mixtures thereof; and (d) contacting the product of said step (c) with a vanadium compound having the structural formula $V(O_2)X^1_{4-s}$, is halogen and s is 0 or 1; a first titanium-containing compound having the structural formula $TiX^3_p(OR^3)_q$, where $X^3$ is halogen, $R^3$ is hydrocarbyl, p is an integer of 1 to 4, and q is 0 or an integer of 1 to 3, with the proviso that the sum of p and q is 4 and, optionally, a second titanium-containing compound of the formula $Ti(OR^2)_nX^2_m$, where $R^2$ is hydrocarbyl, $X^2$ is halogen, n is an integer of 1 to 4, and m is 0 or an integer of 1 to 3 with the proviso that the sum of n and m is 4; and with the further proviso that if two titanium-containing compounds are used said first and said second titanium-containing compounds are not identical. The catalysts of embodiments IV and V are described in U.S. Pat. No. 5,051,388 which is incorporated herein by reference.

All of the supported titanium catalyst components of the aforementioned preferred embodiments I–V are utilized with one or more cocatalysts in the polymerization process. At least one cocatalytic agent which is an organoaluminum compound and, more preferably, an aluminum alkyl or alkylaluminum halide is combined with the titanium component. Further advantages are realized with certain of titanium components if a second cocatalyst silane component is also present. Useful silanes are hydrocarbylalkoxysilanes and have the general formula $R'_a(OR'')_{4-a}Si$ where R' and R'' are the same or different hydrocarbyl groups.

Gas-phase stirred-bed polymerization processes are recognized for their reliability and ability be operated continuously for extended periods to produce large volumes of polymer. Because of the extended residence times for these processes, feed forward control is widely practiced to control reactor variables. However, as one or more of the process variables are controlled or adjusted to alter a particular property, this often has adverse affect on one or more of the other essential properties. With the present invention, it is now possible through the use of a derived parameter to control/adjust conditions in the primary and/or secondary reactors in a manner so that an improved balance of polymer properties and expanded property envelope can be obtained. Furthermore, it is possible to produce these improvements in a consistent manner and to minimize or eliminate the problems heretofore observed in the production of high ethylene content copolymers of this type. It is further possible with the present invention, after achieving conditions in the process which produce an optimum balance of properties, to maintain this balance of properties by making adjustments to compensate for unanticipated fluctuations in the system.

Control of the process is accomplished using a control parameter, referred to as $Q_c$, based on selected integrated peak areas of the $^{13}C$ NMR spectrum for propylene-ethylene copolymers. After acceptable limits are defined for $Q_c$, the product obtained from the second reactor is analyzed and the actual value obtained for the product, referred to as $Q_A$, and compared with the control parameter to determine conformance/nonconformance. Adjustments are made, as required, to the ethylene feed to the secondary reactor and, if necessary, to other process variables to bring the $Q_A$ into conformance with the limits defined for $Q_c$.

It will be understood by those skilled in the art that, if the overall (total) pressure in the second reactor is maintained at the same level, any change in ethylene pressure resulting from adjustments to the ethylene feed in response to the $Q_c$ will require a corresponding change in one or more of the other components present in the gas phase. A change in the partial pressure of ethylene will necessarily change the partial pressure of propylene, hydrogen and any other gas phase components at constant total pressure. The total pressure in the reactor may, on the other hand, be changed in response to changes in the amount of ethylene fed so that the partial pressures at the other gaseous components will remain unchanged.

A number of control parameters may be developed depending on the particular $^{13}C$ NMR peak areas used and the particular algorithm used to calculate the control. In general, however, the control parameter(s) used will be derived using all or some combination of the following $^{13}C$ NMR peaks for solutions of ethylene-propylene copolymers generally accepted by the scientific and technical communities as corresponding to molecular structural features of these copolymers:

| CHEMICAL SHIFT (PPM) | ASSIGNMENT |
| --- | --- |
| 45.6–47.5 | $S_{\alpha\alpha}$ [$CH_2$ of PPP Triads] |
| 37.9 | $S_{\alpha\gamma}$ [$CH_2$ in PEP] |
| 37.5 | $S_{\alpha\delta}^+$ [$CH_2$ in EEEP and PEEP] |
| 33.2 | $T_{TT}^+$ [CH in EPE] |
| 31.2–30.9 | $T_{\beta T}^+$ [CH in PPE] |
| 30.4 | $S_{r\delta}^+$ [$CH_2$ in PEEP] |
| 30.0 | $S_{\delta\delta}^+$ [$CH_2$ in EEEE] |
| 29.0–28.4 | $T_{\beta\beta}$ [CH in PPP] |
| 27.4 | $S_{\beta r}^+$ [$CH_2$ in EEEP and PEEP] |
| 24.9 | $S_{\beta\beta}$ [$CH_2$ in PEP] |
| 21.6–19.5 | P [$CH_3$ in all P Triads] |

The eleven $^{13}C$ NMR peaks listed above have been widely used in the literature to calculate sequential distributions of the six theoretically possibly triads, three dyads, and the overall compositions of copolymers of ethylene and propylene. Details regarding the use of these $^{13}C$ NMR peak areas for the calculation of composition and monomer sequence distributions in copolymers and problems associated with the resolution and determination thereof are available in the text of J. C. Randall, *Polymer Sequence Determination*, Academic Press (1977) or the paper by the same author in *JMS—Rev. Macromol Chem. Phys.*, C29 (2 and 3), 201–317 (1989). Whereas the various methods described by Randall involve the addition and subtraction of numerous peak areas which can result in the summation of errors, the method of the invention uses fewer peaks. Determinations will, of course, depend on the accuracy of the individual integrals and resolution of the peaks in the spectrum.

In one highly useful embodiment of the invention, one or more control parameters derived from eight of the above-identified peak areas, identified as $R_1$–$R_8$, are utilized. The peaks $R_1$ through $R_8$ correspond to the following chemical shifts: $R_1$ 37.9 PPM; $R_2$ 37.5 PPM; $R_3$ 33.2 PPM; $R_4$ 31.2–30.9 PPM; $R_5$ 30.4 PPM; $R_6$ 30.0 PPM; $R_7$ 27.4 PPM and $R_8$ 24.9 PPM. In identifying and resolving the aforementioned peak areas, the methyl peak due to isotactic PPPPP pentads is used as a chemical shift reference line and is set to 21.78 PPM.

In a highly useful and preferred embodiment of the invention, the control parameter $Q_c$ is derived from the eight integral regions of the $^{13}C$ NMR spectrum in accordance with the equation $$Q_c = \frac{A}{B}$$

wherein
$A = 1.167R_1 + 0.75R_2 + 1.5R_3 + 1.5R_4 + 1.167R_8$
$B = 0.667R_1 + 0.5R_2 + R_5 + R_6 + R_7 + 0.667R_8$ where $R_1$ through $R_8$ correspond to the previously identified peak areas. When $Q_c$ conforms to the above definition, the defined limits for $Q_c$ for the process will range from 0.65 to 1.0 and, more preferably, from 0.75 to 0.98. In the event the actual value obtained for $Q_A$ drops below the 0.65 minimum limit, the ethylene feed to the secondary reactor would be decreased and temperature increased, for example, to maintain the desired level of total ethylene in the copolymer. Adjusting the ethylene feed will change the ratio of the partial pressures of the gaseous components in the reactor. Other process conditions and feed rates may but are not necessarily changed to bring the system, i.e., process and copolymer composition, into conformance. When $Q_A$ exceeds the maximum permissible limit of 1.0, the ethylene feed to the secondary reactor would be increased. Additionally, the temperature in the second reactor could be decreased in order to maintain the desired total level of ethylene in the copolymer.

Whereas $Q_c$ is by itself a convenient and highly useful parameter for controlling the reaction conditions in the primary and secondary reactors, it may also be utilized in conjunction with other parameters obtained using other combinations of the characteristic $^{13}C$ NMR peaks. It will be appreciated by those skilled in the art that if comonomers other than ethylene are employed, peak assignments will have to be modified to correspond to the analogous structural features. For propylene-butene-1 copolymers, for example, the structural features for ethyl groups rather than methyl groups will be used. When employed herein, the terms Q, $Q_c$ and $Q_A$ are all determined using the formula A/B, unless otherwise specified.

In addition to being used to control polymerization conditions, the above-defined parameters also describe and differentiate subtle differences in the polymer properties. An illustration of the control of polymer properties includes the ability to obtain improved impact properties at temperatures as low as −40° C. and −50° C. at high rubber contents. Also, by judicious choice of catalyst and reactor conditions it is possible to vary flexural modulus. In this manner, the stiffness/impact balance can be readily tailored to meet the specific needs of an end-user's application. With the process it is also possible to obtain highly desirable and efficient dispersion of the rubber phase so that improved levels of heat distortion temperatures can be obtained. Even with materials having relatively high rubber contents only modest changes in heat deflection temperatures occur.

Thermoplastic polyolefins produced using the present process and having Q values within the previously described ranges have a significantly lower hexane extractable fraction which renders these products highly useful for Food and Drug Administration (FDA) compliant applications. More specifically, it is possible using the process of the invention to readily and consistently produce copolymers which meet the extractables requirements of 21 CFR 1771.1520(c)3.1a and 21 CFR 1771.1520(c) 3.2a. The first regulation is directed to usage in articles that contact food except for articles used for packing or holding food during cooking and requires a maximum extractables fraction (expressed in weight percent by weight of polymer) in n-hexane at 50° C. of 5.5 percent. The latter regulation which applies to articles used for packing or holding food during cooking has a maximum n-hexane extractables limit of 2.6 percent at 50° C. With thermoplastic polyolefin products obtained using prior art processes, and especially with products obtained by physically blending polypropylene with ethylene-propylene copolymers, it has not been possible to consistently meet these extractables limits, particularly the more stringent requirements of 21 CFR 177.1520(c)3.2a. This is particularly so with higher rubber, i.e., higher ethylene, content products. With the products of the invention, and particularly with products prepared in stirred, fixed-bed gas phase reactors using the preferred highly active supported Ti/Al catalysts wherein the support is treated to remove or react surface hydroxyl groups before contacting with the titanium compound, it is possible to consistently meet and exceed these extractables limits even with high rubber content products. This is believed to be the result of the more efficient ethylene utilization achieved by controlling the process using the above-defined control parameter.

In addition to having reduced hexane extractables, the modified polypropylene products produced by the invention also have been found to have significantly improved paint adhesion compared to reactor produced TPOs which have Q values outside the prescribed ranges or TPOs obtained by physically blending polypropylene and ethylene-propylene rubbers. As a result, TPO resins produced by the inventive process are highly useful for automotive applications where good paint adhesion and resistance of painted surfaces to abrasion are essential.

To better understand the operation of the process for the production of high ethylene content in-situ TPOs which are nonsticking and free-flowing, the following examples are provided for illustration. Parts and percentages are on a weight basis unless otherwise indicated.

EXAMPLE I

Preparation of Titanium Catalyst

A supported titanium-containing catalyst having the following loading was prepared:

3.0 mmole ROMgCl/lb silica 4.2 mmole $SiCl_4$/lb silica 0.5 mmole $Ti(OR)_4$/lb silica 18 mmole $TiCl_4$/lb silica For the catalyst preparation hexamethyldisilazane-treated silica (Crosfield EP-10) containing 4% carbon by analysis on silica was charged to a vessel and heated for 8 hours with a nitrogen purge while heating at a temperature of 138°–149° C. The treated silica was cooled to 26.5° C. under 30 psi $N_2$ and 2-methyl-1-pentyloxymagnesium chloride added with stirring. The mixture was heated at 90.5° C. under a nitrogen purge for 2–3 hours and then cooled to 35° C. under 15 psi $N_2$ heptane and silicon tetrachloride solution (35 wt. % in heptane) were then added. The $SiCl_4$ was added at a controlled rate. When the addition was complete, the mixture was heated to 48.9° to 54.4° C. and maintained for 1 hour. The mixture was then cooled and the solids permitted to settle for 2 hours. The bulk of the liquid was siphoned off and fresh heptane added with stirring for 15 minutes. This mixture was permitted to settle for 2 hours and the siphoning repeated. Heptane was again added while stirring followed by the addition of titanium cresylate solution (40% in heptane) and then titanium tetrachloride. The mixture was heated and maintained at 100°±12° C. for 2 hours. After cooling to below 88° C., heptane was added and agitation was stopped. The reactor was cooled to below 65° C. and the mixture allowed to settle for 2 hours. The liquid was siphoned off and fresh heptane added followed by stirring for 15 minutes and 1 hour settling. This procedure was repeated 4 more times. The catalyst was then dried at 99°±12° C. with a nitrogen purge until all the heptane was removed.

Polymerization of Propylene and Ethylene

The ability to utilize the control parameter derived from the $^{13}C$ NMR spectrum in accordance with the equation provided for $Q_c$ in a two-reactor gas-phase operation is demonstrated by the following experiment whereby propylene is polymerized in a first reactor and the product produced therein is fed to the second reactor where ethylene and propylene are copolymerized in the presence of the homopolymer. Reactor conditions and/or feed rates were selected for these runs so that the control parameter was nominally maintained within the broad range for $Q_c$ of 0.65 to 1.0.

Two conventional 800 liter gas-phase polymerization reactors, each equipped with a stirrer to maintain turbulent mechanical fluidization of the polymer powder within, were connected so that polymer from the first (primary) reactor was introduced into the second (secondary) reactor. Propylene and hydrogen were continuously metered at controlled rates to the first reactor. Titanium catalyst and two cocatalysts were independently metered. The first cocatalyst was triethylaluminum which was introduced as a 25% solution in heptane. The second cocatalyst, isobutyltrimethoxysilane, was introduced as a 15% solution in heptane. The catalyst and cocatalyst agents were fed at rates to maintain the specified triethylaluminum/silane/titanium ratio. Ethylene, propylene and hydrogen were continuously metered at controlled rates to the second reactor. An alcohol modifier was also added. No catalyst or cocatalyst was added to the second reactor.

The actual value, $Q_A$, obtained for the modified polypropylene produced under steady state conditions is indicated in Table I. Operating conditions employed in the primary and secondary reactors to achieve and maintain production of polymer having that $Q_A$ value are also provided in Table I.

TABLE I

|  | RUN 1 | RUN 2 | RUN 3 |
| --- | --- | --- | --- |
| $Q_A$ | 0.80 | 0.71 | 0.64 |
| Primary Reactor: |  |  |  |
| Alkylaluminum/silane/titanium ratio | 100/10/1 | 150/10/1 | 150/10/1 |
| Alkylaluminum Solution Feed Rate (oz/hr) | 16.2 | 16.2 | 16.6 |
| Propylene Feed Rate (lbs/hr) | 242.7 | 160.9 | 243.4 |
| $H_2$ Feed Rate (SCFH) | 5.44 | 4.03 | 5.70 |
| Temperature (°C.) | 77 | 77 | 77 |
| Pressure (psig) | 401.6 | 400.0 | 402.0 |
| Recycle (GPM) | 2.08 | 1.12 | 2.43 |
| Secondary Reactor: |  |  |  |
| Propylene Feed Rate (lbs/hr) | 71.9 | 44.4 | 59.1 |
| Ethylene Feed Rate (lbs/hr) | 91.6 | 98.7 | 162.1 |
| Hydrogen Feed Rate (SCFH) | 4.96 | 13.83 | 11.19 |

TABLE I-continued

|  | RUN 1 | RUN 2 | RUN 3 |
|---|---|---|---|
| Alcohol Feed Rate (oz/hr) | 140.7 | 55.1 | 50.0 |
| Temperature (°C.) | 54 | 60 | 60 |
| Pressure (psig) | 199.8 | 200.0 | 200.1 |
| Liquid Recycle (GPM) | 1.83 | 1.79 | 2.95 |
| Gas Recycle (SCFH) | 5.29 | 4.52 | 7.69 |

The polymer powder obtained from the second reactor was free-flowing and non-sticky. Bulk density, mean particle size and amount of fines were determined for the powders and are reported in Table II. The powders were processed in an extruder where conventional additives were incorporated into the melt and then pelletized. The modified polypropylene was analyzed and physical properties determined. Results are listed in Table II. The notation N.D. in the tables indicates that a value was not determined for the product.

TABLE II

|  | PRODUCT OF | | |
|---|---|---|---|
|  | RUN 1 | RUN 2 | RUN 3 |
| Bulk Density (lb/ft$^3$) | 19.1 | 20.7 | 20.1 |
| Mean Particle Size (μM) | 1028 | 1256 | 1242 |
| % Fines < 180 μM | 0.2 | 0 | 0.1 |
| % Fines < 350 μM | 4.8 | 0.45 | 0.9 |
| Ethylene Content (wt. %) | 16.0 | 20.6 | 23.1 |
| Ti (ppm) | 6.9 | 4.8 | 4.0 |
| Al (ppm) | 406 | 400 | 297 |
| Cl (ppm) | 49 | 32 | 35 |
| Melt Flow Rate (pellet; dg/min) | 2.91 | 2.09 | 2.16 |
| Melt Temperature (DSC; °C.) | 161.26 | N.D. | N.D. |
| Tensile Yield (psi) | 2382 | 2084 | N.D. |
| Elongation Yield (%) | 17.8 | 17.8 | N.D. |
| Flexural Modulus (psi) | 84200 | 82400 | N.D. |

EXAMPLE II

Another series of polymers were prepared utilizing a supported titanium-containing catalyst wherein the silica support was treated prior to contacting with the titanium moiety. For these runs the supported titanium catalyst was prepared in accordance with the procedure of Example I except that the catalyst loading was as follows:

5.5 mmole ROMgCl/lb silica 5.5 mmole SiCl$_4$/lb silica 0.6 mmole Ti(OR)$_4$/lb silica 18 mmole TiCl$_4$/lb silica For the four polymerizations, $Q_c$ was maintained within the preferred range of 0.75–0.98. The polymerizations were carried out following the procedure described in Example I. The $Q_A$ value of the modified polypropylene product and reactor conditions are set out in Table III. Properties of the in-situ thermoplastic polyolefins produced are identified in Table IV.

TABLE III

|  | RUN 1 | RUN 2 | RUN 3 | RUN 4 |
|---|---|---|---|---|
| $Q_A$ | 0.83 | 0.85 | 0.81 | 0.76 |
| Primary Reactor: | | | | |
| Alkylaluminum/silane/titanium ratio | 100/10/1 | 100/10/1 | 100/10/1 | 100/10/1 |
| Alkylaluminum Feed Rate (oz/hr) | 15 | 12.7 | 16.5 | 14 |
| Propylene Feed Rate (lbs/hr) | 309 | 314.6 | 326.7 | 305.3 |
| H$_2$ Feed Rate (SCFH) | 3.5 | 2.5 | 3.1 | 2.73 |
| Temperature (°C.) | 77 | 77 | 77 | 77 |
| Pressure (psig) | 399.3 | 399 | 395 | 403 |
| Recycle (GPM) | 3.4 | 4.27 | 3.53 | 3.56 |
| Secondary Reactor: | | | | |
| Propylene Feed Rate (lbs/hr) | 136.5 | 71.5 | 162.5 | 134.5 |
| Ethylene Feed Rate (lbs/hr) | 180 | 144.5 | 193 | 186.5 |
| Hydrogen Feed Rate (SCFH) | 0.3 | 3.4 | 0 | 0 |
| Alcohol Feed Rate (oz/hr) | 6.85 | 3.45 | 0 | 1.05 |
| Temperature (°C) | 65.5 | 65.5 | 65.5 | 65.5 |
| Pressure (psig) | 219 | 220.5 | 222 | 220.5 |
| Liquid Recycle (GPM) | 1.45 | 1.45 | 1.85 | 1.75 |
| Gas Recycle (SCFH) | 0 | 0 | 0 | 0 |

TABLE IV

|  | PRODUCT OF | | | |
|---|---|---|---|---|
|  | RUN 1 | RUN 2 | RUN 3 | RUN 4 |
| Bulk Density (lb/ft$^3$) | 22.3 | 19.8 | 19.9 | 22.5 |
| Mean Particle Size (μM) | 1236 | 1365 | 1296 | 1323 |
| % Fines < 90 μM | 0.1 | 0 | 0 | 0.1 |
| Ethylene Content (Wt. %) | 16.0 | 17.0 | 19.4 | 19.9 |
| Ti (ppm) | 2.6 | 2.3 | 2.5 | 1.7 |
| Al (ppm) | 209 | 179 | 201 | 165 |
| Cl (ppm) | 28 | 24 | 24 | 19 |
| Melt Flow Rate (pellet; dg/min) | 1.18 | 1.81 | 1.76 | 1.12 |
| Melt Temperature (DSC; °C.) | 161.8 | 161.2 | 161.2 | 161.8 |
| Tensile Yield (psi) | 2181 | 2120 | 1910 | 1742 |
| Elongation Yield (%) | 34 | 27 | 27 | 34 |
| Flexural Modulus (psi) | 79300 | 75400 | 63500 | 60500 |

The in-situ thermoplastic polyolefins produced in the foregoing examples are intimate mixtures of highly isotactic polypropylene produced in the first reactor and the rubber-like propylene-ethylene copolymer produced in the second reactor. By use of defined parameters to control the process conditions, it is possible to produce high ethylene content products which have desirable physical characteristics without operational problems.

The polymers produced in accordance with the process of the invention using control values in the defined $Q_c$ range have a useful balance of structural characteristics and physical properties. It is apparent that the property envelope of these copolymers can be varied by adjusting operating conditions so that the value of Q will be changed, e.g., by changing the ethylene feed to the second reactor and, if necessary, other process conditions. To operate the system so as to obtain a lower value for $Q_A$, the amount of ethylene in the second reactor would be increased. If it is desired to increase the $Q_c$ target to a higher value, adjustments would be made to decrease the amount of ethylene fed to the secondary reactor. In line process changes of this type are readily accomplished during continuous operation to bring the system into conformance with $Q_c$ target or to vary $Q_c$ within the defined limits in order to vary structural characteristics and/or physical properties of the in-situ TPO produced.

EXAMPLE III AND COMPARATIVE EXAMPLE A

To demonstrate the reduced extractables content of the thermoplastic polyolefins produced using the process of the invention, two copolymer products having comparable ethylene contents and melt flow rates were produced following the polymerization procedure described in Example I. The first ethylene-propylene copolymer, referred to as EX III, was prepared in accordance with the invention using a supported Ti/Al catalyst system as described in Example I and maintaining Q within the prescribed range. The comparative propylene-ethylene copolymer, referred to as CEX A, was produced using a supported Ti/Al catalyst of the type described in British Patent 2109800B and had a Q value outside the prescribed range. While the physical properties of the two products were comparable, the hexane extractables (determined using n-hexane at 50° C.) was three times higher for the comparative copolymer and did not meet the FDA requirements per 21 CFR 177.1520(c)3.2a for use in articles used for packing or holding food during cooking. Physical properties of the two products, along with their Q values, ethylene contents, melt flow rates and hexane extractables are set forth in the table which follows.

|  | EX III | CEX A |
| --- | --- | --- |
| Q | 0.79–0.81 | 0.61–0.62 |
| Ethylene Content (Wt. %) | 9.1 | 9.7 |
| Melt Flow Rate (pellet; dg/min) | 4.2 | 5.0 |
| Hexane Extractables (Wt. %) | 1.5 | 4.7 |
| Flexural Modulus (psi) | 144100 | 145000 |
| Gardner Impact @ 23° C. (in-lbs) | 451 | 350 |
| Notched Izod @ 23° C. (ft-lbs/in) | 2.8 | 2.2 |
| Unnotched Izod @ −18° C. (ft-lbs/in) | 23 | 20 |

EXAMPLES IV–V AND COMPARATIVE EXAMPLES B–E

To further demonstrate the improved copolymer products obtainable from the present process, two inventive products (EX IV and EX V) of varying ethylene content, melt flow rate, and Q value were prepared and compared with a product with a Q value outside the prescribed range (CEX B), a physically blended product (CEX C) and two commercially available reactor-produced TPOs (CEX D and CEX E). The products were compared with regard to their paint adhesion characteristics by evaluating painted copolymer specimens using two test procedures developed for the automotive industry. The first procedure, General Motors Test Procedure 9911P, determines the resistance of paint to be removed from a TPO substrate material using a Taber Abraser Model 5150 fitted with a scuffing attachment. In this test the percent paint removal during 100 cycles is reported per the procedure. Another procedure, Ford Laboratory Test Method BI 107-5, is a thermal shock test for paint adhesion designed to simulate the wet blast produced by vehicle wash equipment. In this test, the painted specimens prepared and conditioned in accordance with the procedure are examined after a steam blast for a minimum of 30 seconds and samples showing any loss of paint adhesion or blushing are noted. Results are reported by giving the number of samples passing versus the total number tested. For all of the evaluations, the prescribed specimens were coated first with an adhesion promotor (Bee HP 210584 HS), then with the base coat (DuPont 542-DF716 White) and finally with a clear coat (DuPont RK 3939). Results obtained using the copolymers of the invention and the comparative products are set forth in Table V. In addition to results of the paint tests, the Q value, ethylene content, melt flow rate and flexural modulus are reported for each of the products.

TABLE V

|  | EX IV | EX V | CEX B | CEX C | CEX D | CEX E |
| --- | --- | --- | --- | --- | --- | --- |
| Q | 0.79 | 0.82 | 0.57 | 0.61 | 0.54 | 0.61 |
| Ethylene Content (Wt. %) | 11.5 | 14.3 | 14.1 | 17.4 | 14.0 | 15.2 |
| Melt Flow Rate (pellet: dg/min) | 11.0 | 10.8 | 10.5 | 11.2 | 11.5 | 10.4 |
| Flexural modulus (psi) | 100,000 | 84,000 | 102,000 | 106,000 | 109,000 | 84,000 |
| Taber Test (% paint removed) | 0.8 | 0.1 | 21.7 | 74.8 | 39.8 | 27.2 |
| Thermal Shock Test (Pass/Total tested) | 20/20 | 20/20 | 14/20 | 8/20 | 11/20 | 12/20 |

It is apparent from the data provided in Table V that superior paint adhesion is obtained with the products of the invention. Extremely low paint removal values were observed for Examples IV and V and there were no failures in the thermal shock test. With the product having a Q value outside the prescribed range, paint adhesion was unacceptable. Also, unacceptable results were observed with the physically blended product CEX C and with the two commercial products (CEX D and CEX E).

We claim:

1. In a gas-phase process for producing thermoplastic polyolefins in multiple reactors wherein propylene is homopolymerized in a first reactor maintained at 50° C. to 100° C. and 250 psig to 650 psig in the presence of a supported high activity Ziegler-Natta catalyst comprised of a titanium-containing catalyst component and organoaluminum cocatalyst component and the product produced therein is fed to a second reactor maintained at 25° C. to 80° C. and 100 psig to 500 psig where propylene is copolymerized with ethylene, to obtain high rubber content modified polypropylene having reduced hexane extractables and improved paintability, the improvement comprising:

(a) calculating a control parameter $Q_c$ using eight integrated areas of the $^{13}C$ NMR spectrum corresponding to molecular structural features for copolymers of propylene and ethylene in accordance with the equation:

$$Q = \frac{A}{B}$$

where $A = 1.167R_1 + 0.75R_2 + 1.5R_3 + 1.5R_4 + 1.167R_8$
$B = 0.667R_1 + 0.5R_2 + R_5 + R_6 + R_7 + 0.667R_8$
and $R_1$ through $R_8$ have the following peak assignments:

| | |
|---|---|
| $R_1$ | 37.9 PPM |
| $R_2$ | 37.5 PPM |
| $R_3$ | 33.2 PPM |
| $R_4$ | 31.2–30.9 PPM |
| $R_5$ | 30.4 PPM |
| $R_6$ | 30.0 PPM |
| $R_7$ | 27.4 PPM |
| $R_8$ | 24.9 PPM; |

(b) selecting limits of $Q_c$ for the process within the range 0.65 to 1.0;

(c) determining the actual value of the parameter, $Q_A$, for the polymer obtained from the second reactor; and (d) controlling the ethylene feed to maintain $Q_A$ within the limits defined in (b).

2. The process of claim 1 wherein the support is treated to remove or react surface hydroxyl groups prior to contacting with the titanium-containing catalyst component.

3. The process of claim 1 wherein the first and second reactors are stirred, fixed-bed reactors.

4. The process of claim 1 wherein one or more α-olefins containing from 4 to 8 carbon atoms are included in the polymerization.

5. The process of claim 2 wherein an amount of ethylene sufficient to incorporate from 15 to 30 weight percent ethylene in the polymer is fed to the second reactor.

6. The process of claim 5 wherein an amount of hydrogen ranging from 0.1 to 5 mol percent is included in the first reactor and an amount of hydrogen from 1 to 10 mol percent is included in the second reactor.

7. The process of claim 6 wherein the operating limits for $Q_c$ is in the range from 0.75 to 0.98.

8. The process of claim 7 wherein the first and second reactors are stirred, fixed-bed reactors.

9. The process of claim 6 wherein the titanium-containing catalyst component is obtained by (a) treating silica to remove surface hydroxyl groups by calcining said silica in an inert atmosphere and treating with a hexaalkyldisilazane; (b) contacting said treated silica with (1) a modifying compound selected from the group consisting of silicon halides, boron halides, aluminum halides, alkyl silicon halides and mixtures thereof; and (2) at least one hydrocarbon soluble magnesium-containing compound selected from the group consisting of hydrocarbyloxy magnesiums, hydrocarbyloxymagnesium halides and mixtures thereof; said contacting steps (1) and (2) occurring in random order; (c) contacting said product of step (b) with at least one titanium-containing compound having the structural formula Ti(OR)$_n$X$_m$, where R is aryl, alkyl or mixtures thereof; X is halogen; n is an integer of 1 to 4; m is 0 or an integer of 1 to 3; and the sum of m and n is 4; and (d) treating the product of step (c) with a titanium-containing compound having the structural formula TiX$^1_p$(OR$^1$)$_q$, where X$^1$ is halogen; R$^1$ is aryl or alkyl; p is an integer 1 to 4; q is 0 or an integer of 1 to 3; and the sum of p and q is 4, with the proviso that the titanium-containing compound of this step is not the same as the titanium-containing compound of step (c).

10. The process of claim 9 wherein an alkylaluminum or alkylaluminum halide and an optional silane cocatalyst of the formula R'$_a$(OR")$_{4-a}$Si where R' and R" are hydrocarbyl groups are present with the titanium-containing catalyst component.

11. The process of claim 6 wherein the titanium-containing catalyst component is obtained by treating silica to remove surface hydroxyl groups by calcining in an inert atmosphere and treating with a hexaalkyldisilazane and reacting said modified silica support having a selective distribution of reactive hydroxyl groups with a magnesium compound reactive with said surface hydroxyl groups, optionally reacting the thus obtained product with a silicon halide, alkyl silicon halide, boron halide or aluminum halide, further reacting the so-produced first material with a tetra-substituted organo halogen-free titanium compound wherein the organic moiety sterically hinders accessibility of said organo titanium compound to the reactive sites on the modified silica support and thereafter reacting the so-produced second material with a titanium halide.

12. The process of claim 11 wherein an alkylaluminum or alkylaluminum halide and an optional silane cocatalyst of the formula R'$_a$(OR")$_{4-a}$Si where R' and R" are hydrocarbyl groups are present with the titanium-containing catalyst component.

13. The process of claim 6 wherein the titanium-containing catalyst component is obtained by (a) contacting silica, in random order, with (1) at least one hydrocarbon soluble magnesium-containing compound; and (2) a first modifying compound selected from the group consisting of silicon halide; boron halides, aluminum halides and mixtures thereof followed by a second modifying compound selected from the group consisting of a silane of the formula SiH$_l$X$^2_r$, where X$^2$ is halogen; r is an integer of 1 to 3; and s is an integer of 1 to 3, with the proviso that the sum of r and s is 4, hydrogen halides having the structural formula HX$^3$, where X$^3$ is halogen, and mixtures thereof, said sequence of contact of silica with said components (1) and (2) being random; (b) contacting the product of step (a) with a first titanium-containing compound having the structural formula Ti(OR)$_m$X$_n$, where R is hydrocarbyl or cresyl; X is halogen; m is an integer of 1 to 4; and n is 0 or an integer of 1 to 3, with the proviso that the sum of m and n is 4; and (c) contacting the product of step (b) with a second titanium-containing compound having the structural formula TiX$^1_p$(OR$^1$)$_q$, where X$^1$ is halogen; R$^1$ is hydrocarbyl; p is an integer of 1 to 4; q is 0 or an integer of 1 to 3, with the provisos that the sum of p and q is 4 and that said first titanium-containing compound and said second titanium-containing compound are different.

14. The process of claim 13 wherein an alkylaluminum or alkylaluminum halide and an optional silane cocatalyst of the formula R'$_a$(OR")$_{4-a}$Si where R' and R" are hydrocarbyl groups are present with the titanium-containing catalyst component.

15. The process of claim 6 wherein the titanium-containing catalyst component is obtained by (a) treating an inert inorganic support with hexamethyldisilazane to remove surface hydroxyl groups and heating at 100°–150° C. for ½ to 3 hours; (b) contacting said treated inert inorganic support with a hydrocarbon soluble magnesium compound; (c) contacting said product of said step (b) with a modifying compound selected from the group consisting of silicon halides, boron halides, aluminum halides, hexaalkyldisilazanes and mixtures thereof; (d) contacting said product of said step (c) with a vanadium compound having the structural formula V(O)$_s$X$^1_{4-s}$, where X$^1$ is halogen; and s is 0 or 1; a first titanium-containing compound having the structural formula TiX$^3_p$(OR$^3$)$_q$, where X$^3$ is halogen; R$^3$ is hydrocarbyl; p is an integer of 1 to 4; and q is 0 or an integer of 1 to 3, with the proviso that the sum of p and q is 4 and, optionally, a second titanium-containing compound of the formula Ti(OR$^2$)$_n$X$^2_m$, where R$^2$ is hydrocarbyl; X$^2$ is halogen; n is an integer of 1 to 4; and m is 0 or an integer of 1 to 3 with the proviso that the sum of n and m is 4; and with the further proviso that if two titanium-containing compounds are used said first and said second titanium-containing compounds are not identical.

16. The process of claim 15 wherein the catalyst is obtained by an alkylaluminum or alkylaluminum halide and an optional silane cocatalyst of the formula $R'_a(OR'')_{4-a}$ Si where R' and R" are hydrocarbyl groups are present with the titanium-containing catalyst component.

17. The process of claim 6 wherein the titanium-containing catalyst component is obtained by (a) treating an inert inorganic support to a temperature of 100° C. to 150° C. for ½ to 3 hours to remove surface hydroxyl groups; (b) contacting the treated inert inorganic compound with a hydrocarbon soluble magnesium compound; (c) contacting the product of said step (b) with a modifying compound selected from the group consisting of silicon halides, boron halides, aluminum halides, alkyl silicon halides, hexaalkyldisilazanes and mixtures thereof; and (d) contacting the product of said step (c) with a vanadium compound having the structural formula $V(O_2)X^1_{4-s}$, is halogen and s is 0 or 1; a first titanium-containing compound having the structural formula $TiX^3_p(OR^3)_q$, where $X^3$ is halogen, $R^3$ is hydrocarbyl, p is an integer of 1 to 4, and q is 0 or an integer of 1 to 3, with the proviso that the sum of p and q is 4 and, optionally, a second titanium-containing compound of the formula $Ti(OR^2)_nX^2_m$, where $R^2$ is hydrocarbyl, $X^2$ is halogen, n is an integer of 1 to 4, and m is 0 or an integer of 1 to 3 with the proviso that the sum of n and m is 4; and with the further proviso that if two titanium-containing compounds are used said first and said second titanium-containing compounds are not identical.

18. The process of claim 17 wherein an alkylaluminum or alkylaluminum halide and an optional silane cocatalyst of the formula $R'_a(OR'')_{4-a}$ Si where R' and R" are hydrocarbyl groups are present with the titanium-containing catalyst component.

19. A modified polypropylene having improved paint adhesion and reduced hexane extractables produced by the process of claim 1 containing from 15 to 30 weight percent ethylene and having a value for Q in the range 0.65 to 1.0 where Q is determined using integrated areas of the $^{13}C$ NMR spectrum of the copolymer in accordance with the equation:

$$Q = \frac{A}{B}$$

where $A=1.167R_1+0.75R_2+1.5R_3+1.5R_4+1.167R_8$ $B=0.667R_1+0.5R_2+R_5+R_6+R_7+0.667R_8$ and $R_1$ through $R_8$ have the following peak assignments

| | |
|---|---|
| $R_1$ | 37.9 PPM |
| $R_2$ | 37.5 PPM |
| $R_3$ | 33.2 PPM |
| $R_4$ | 31.2–30.9 PPM |
| $R_5$ | 30.4 PPM |
| $R_6$ | 30.0 PPM |
| $R_7$ | 27.4 PPM |
| $R_8$ | 24.9 PPM |

20. The modified polypropylene of claim 19 wherein Q is in the range 0.75 to 0.98.

* * * * *